United States Patent [19] [11] 3,909,693
Yoshitake et al. [45] Sept. 30, 1975

[54] SYSTEM FOR DRIVING A PULSE MOTOR

[75] Inventors: Norito Yoshitake, Hino; Hiroshi Usami, Yokohama; Hiroshi Ishida; Makoto Ohtomi, both of Tokyo, all of Japan

[73] Assignees: Fujitsu Limited; Fujitsu Funac Limited, both of Tokyo, Japan

[22] Filed: Nov. 9, 1973

[21] Appl. No.: 414,233

[30] Foreign Application Priority Data
Nov. 14, 1972  Japan.............................. 47-114548

[52] U.S. Cl................................. 318/696; 290/138
[51] Int. Cl.[2]....................................... H02K 37/00
[58] Field of Search ......... 318/696, 685, 138, 254; 310/49

[56] References Cited
UNITED STATES PATENTS

| 3,445,741 | 5/1969 | Gerber | 318/696 |
| 3,512,066 | 5/1970 | Gerber et al. | 318/685 |
| 3,612,973 | 10/1971 | Kuniyoshi | 318/138 |
| 3,621,358 | 11/1971 | Hinrichs | 318/696 |
| 3,678,352 | 7/1972 | Bedford | 318/138 |
| 3,678,358 | 7/1972 | Kolatorowicz | 318/138 |
| 3,696,278 | 10/1972 | Kuniyoshi | 318/138 |
| 3,777,246 | 12/1973 | Barnes | 318/685 |

*Primary Examiner*—G. R. Simmons
*Attorney, Agent, or Firm*—Maleson, Kimmelman and Ratner

[57] ABSTRACT

System for driving an electric pulse motor, which provides n exciting coils, and generates, in accordance with command pulses, n exciting control voltages having a trapezoidal waveform with a phase difference which depends on the speed of said command pulses. Said n exciting control voltages are respectively supplied via linear current amplifiers to the exciting coils of the electric pulse motor. Therefore, by using exciting control voltages having a trapezoidal waveform, the movement of the electric pulse motor steps very smoothly.

4 Claims, 20 Drawing Figures

PP

A

B

C

D

E

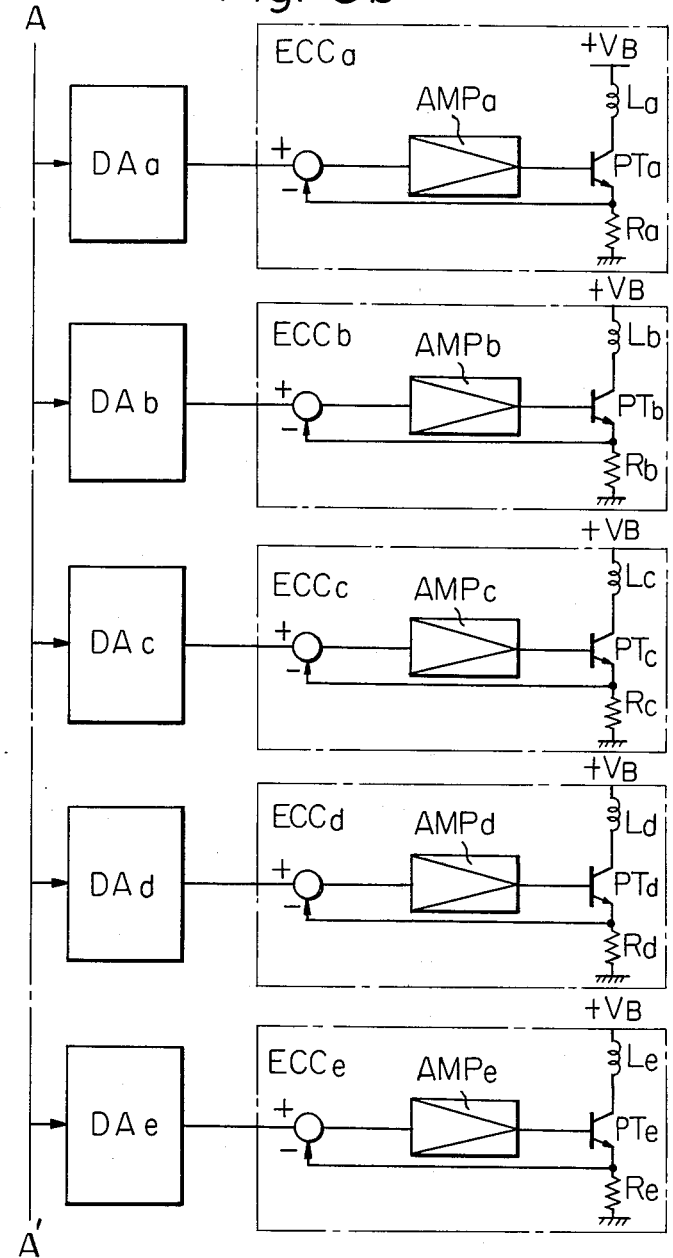

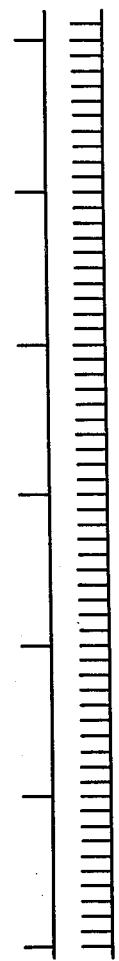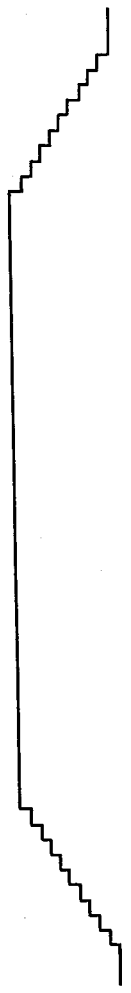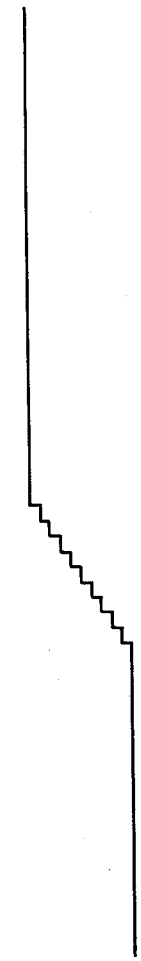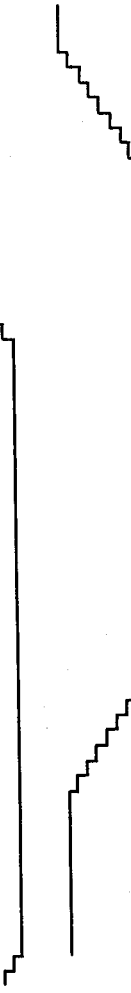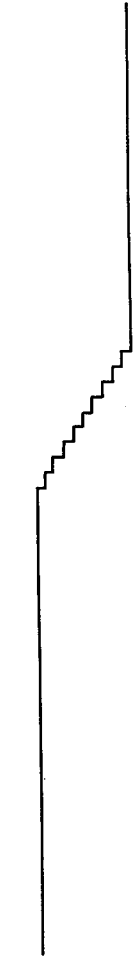
Fig. 7A CP
Fig. 7B CW
Fig. 7C Aa
Fig. 7D Ba
Fig. 7E Ca
Fig. 7F Da
Fig. 7G Ea

SYSTEM FOR DRIVING A PULSE MOTOR

The present invention relates to a system for driving a rotary type or a linear type electric pulse motor and especially to a system for smoothly driving the moving part of the pulse motor.

BACKGROUND OF THE INVENTION

An electric pulse motor steps by a predetermined angle every time a pulse motor receives an input pulse. However, since exciting coils of the conventional electric pulse motor are excited by an exciting current having a square waveform, the rotation of the electric pulse motor is carried out in intermittent steps.

For example, in the conventional five phase electric pulse motor, a three phase-two phase alternate excitation system, input pulses received by the motor alternately cause three phase and two phase excitations and as an exciting current a current having a square waveform is used. Therefore, a rotational displacement of one step is immediately completed after the receipt of one input pulse but before the receipt of the next. Thus the rotation of the pulse motor is not smooth but, rather, is carried out in intermittent steps.

As a result of the above, when, for example the conventional electric pulse motor, whether five phase or otherwise is used to drive a movable part of finishing machine such as lathe machine, the surface of work which is finished by said finishing machine becomes uneven due to the intermittent step rotation of the electric pulse motor. Therefore, the appearance of the finished surface of the work is sometimes spoiled.

For the purpose of smoothly driving the electric pulse motor, it is required to excite the electric pulse motor with an exciting control voltage which supplies a current having a trapezoidal waveform.

SUMMARY OF THE INVENTION

In the system for driving an electric pulse motor according to the present invention, the electric pulse motor utilizes the exciting voltage having a trapezoidal waveform. That is, the exciting current in an exciting coil, which is to be newly excited, increases with a linear inclination with respect to the time till the pulse motor receives a next input pulse. On the other hand, the exciting current in an exciting coil, which is to be newly de-excited, decreases with a linear inclination to the time. As a result of this, the rotation of the pulse motor becomes smooth, and the unevenness of the surface of the work which is finished by the finishing machine can be removed.

For realizing above-mentioned features, in the system according to the present invention, an n phase electric pulse motor provides n exciting coils, and generates, in accordance with input command pulses, n exciting control voltages having a trapezoidal waveform with a phase difference which depends on the speed of said input command pulses. Said n exciting coil voltages are respectively supplied via linear current amplifiers to the exciting coils of the electric pulse motor. Therefore, by using the exciting control voltages having a trapezoidal waveform, the movement of the electric pulse motor becomes very smooth. According to one embodiment of the present invention, the inclination parts of the trapezoidal form of the exciting currents are constituted with a staircase form by using a series of pulses which are produced by multiplying the command pulses.

BRIEF EXPLANATION OF THE DRAWINGS

Further features and advantages of the present invention will be apparent from the ensuing description with reference to the accompanying drawings to which, however, the scope of the invention is no way limited.

FIGS. 3a and 3b are a block diagram of one embodiment of the system for driving a pulse motor according to the present invention;

FIGS. 7A through 7G are diagrams explaining waveforms of the exciting voltages of the block diagram of FIGS. 3a and 3b;

DETAILED EXPLANATION OF THE INVENTION

Figure 1:
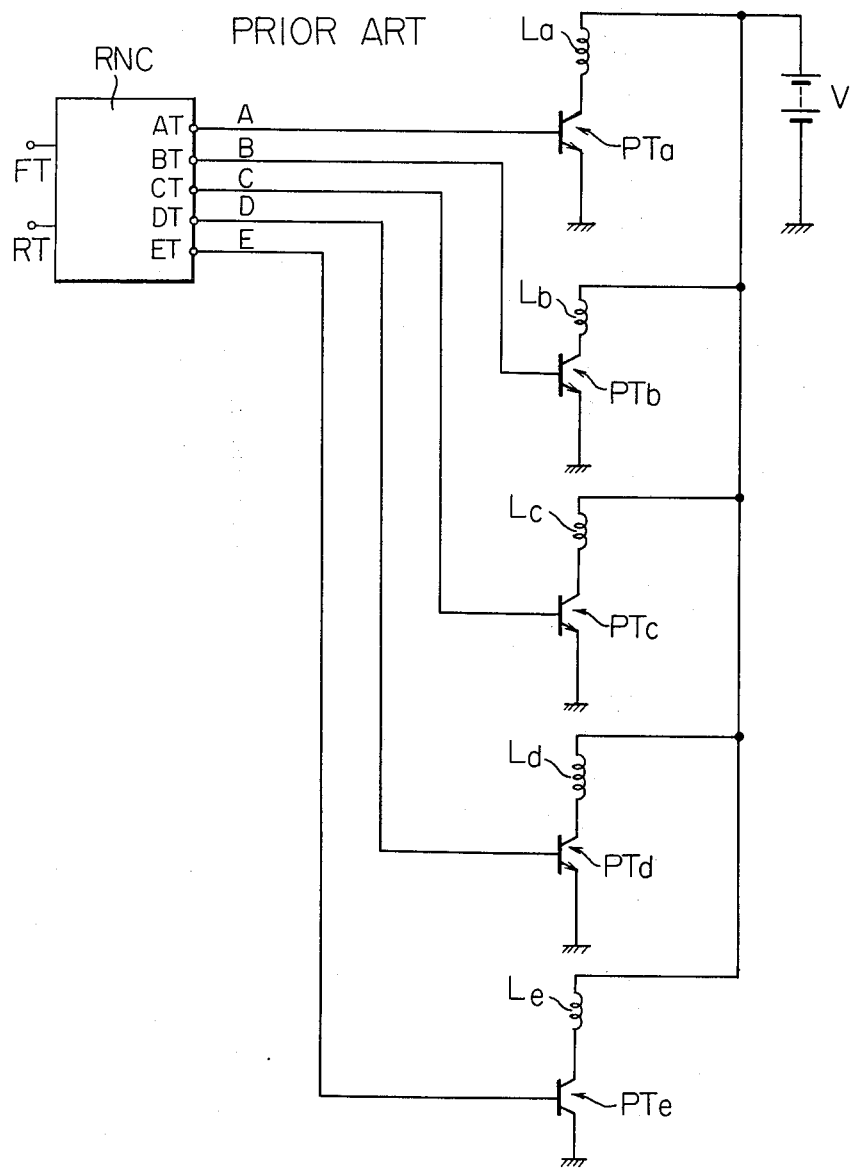
FIG. 1 is a block diagram explaining a conventional system for driving a pulse motor.
Figure 2A:
FIGS. 2A through 2F are diagrams showing waveforms of the command pulse and exciting voltages used in the block diagram of FIG. 1.
Figure 2B:
Figure 2C:
Figure 2D:
Figure 2E:
Figure 2F:

Referring to FIG. 1 La through Le represent exciting coils of the electric pulse motor, $P_{Ta}$ through $P_{Te}$ represent switching power transistors which are connected to the exciting coils La through Le, and V represents a direct current electric source. Five phase ring counter RNC provides two input terminals FT, RT and five output terminals AT through ET. Whenever a positive command pulse is supplied to the input terminal FT, the output voltages of each terminal AT through ET of the five phase ring counter RNC change as shown in FIGS. 2A through 2F respectively. That is, when the first command pulse is received in the input terminal FT, the output voltages D, E and A appear respectively on the terminals DT, ET and AT. Then, when the second command pulse is received in the input terminal FT, the output voltages E and A appear respectively on the terminals ET and AT. Similarly, when command pulses are received in the input terminal FT, the output voltages change in order DEA → EA → EAB → AB → ABC → ... DE   DEA, and this order is continually repeated. The abovementioned output voltages are supplied via the switching power transistors $P_{Ta}$ through $P_{Te}$ to each exciting coil of the electric pulse motor. In this manner three phase and two phase alternate excitation is carried out in the five phase electric pulse motor.

When a negative command pulse is received in the input terminal RT, the sequence of output voltages which appear on the output terminals is the reverse of that which results from a positive command pulse supplied to the input terminal FT.

In the conventional system as described above, when command pulses are supplied to the input terminal FT or RT, one of the output voltages A through E immediately rises or falls as shown in FIGS. 2A through 2F. Referring to FIGS. 2A through 2F, between the fourth and the fifth command pulses, the output voltages A and B are supplied to base terminals of the switching power transistors $P_{Ta}$ and $P_{Tb}$ shown in FIG. 1 and the exciting coils $La$ and $Lb$ shown in FIG. 1 are excited. When the fifth command pulse arrives, the output pulse C, shown in FIG. 2D suddenly rises and then the exciting coil $Lc$ is also suddenly excited. Because the exciting coil $Lc$ is suddenly excited, the rotor of the electric pulse motor is shocked, and the smoothness of the movement of the rotor is supplied. Such phenomenon is also produced when the sixth command pulse arrives and the output voltage A suddenly falls to zero.

Figure 3A:
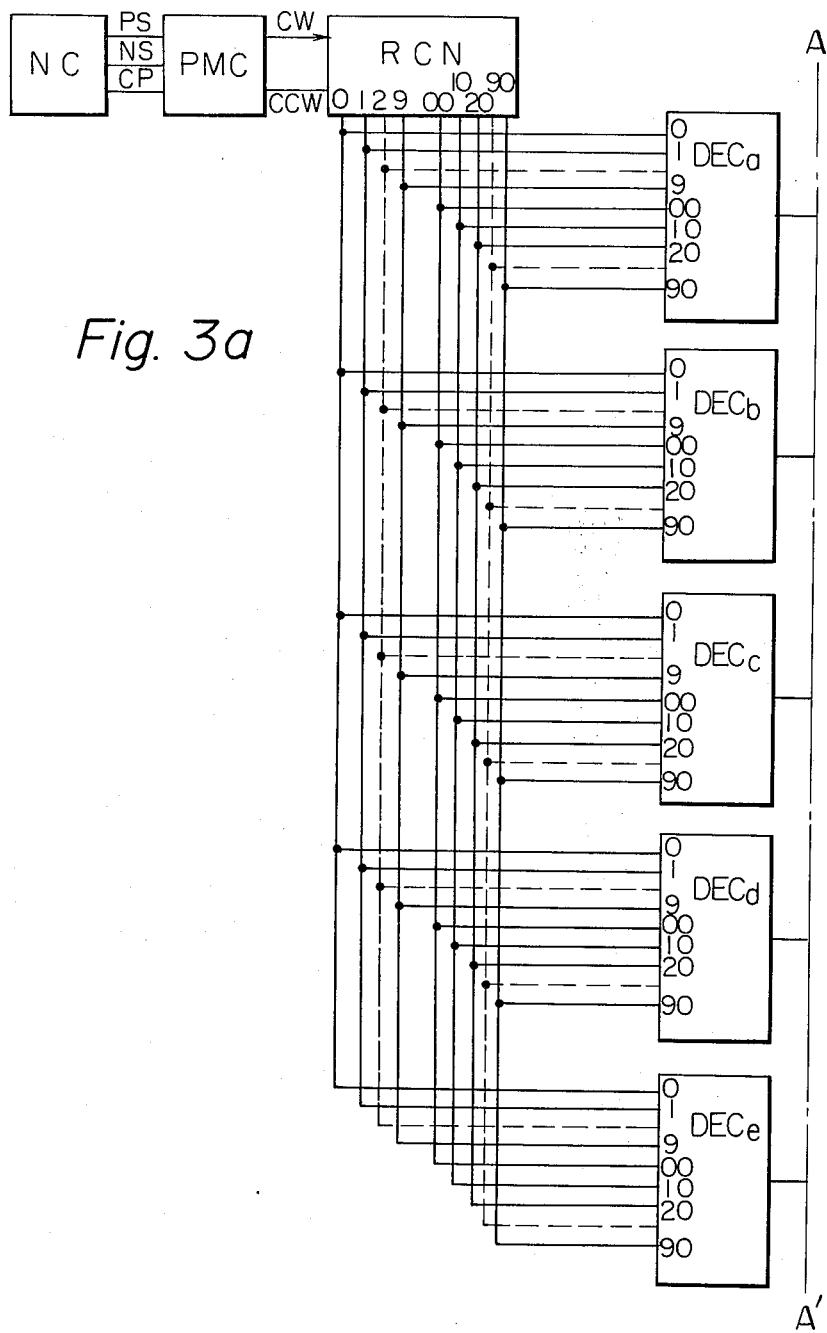

FIG. 3 is a block diagram of the system according to the present invention. Referring to FIGS. 3a and 3b an input of a pulse multiplier circuit PMC is connected to a numerical control apparatus NC and an output of the pulse multiplier circuit PMC is connected to a one hundred number system reversible counter RCN. The output of the one hundred number system reversible counter RCN is connected to five decoder circuits $DECa$, $DECb$, $DECc$, $DECd$ and $DECe$. The outputs of the decoder circuits $DECa$, $DECb$, $DECc$, $DECd$ and $DECe$ are respectively supplied to digital-analog converters $DAa$, $DAb$, $DAc$, $DAd$ and $DAe$, and the outputs of the digital-analog converters $DAa$, $DAb$, $DAc$, $DAd$ and $DAe$ are respectively supplied to exciting control circuits $ECCa$, $ECCb$, $ECCc$, $ECCd$ and $ECCe$.

In the above-mentioned block diagram, the numerical control unit NC sends command pulses CP, and signals PS and NS to indicate the polarity of the command pulses CP, to the pulse multiplier circuit PMC. Every time one command pulse CP is impressed, the pulse multiplier circuit PMC generates, in accordance with the polarity of the command pulse CP, ten pulses to an output line CW or CCW. Content of the one hundred number system reversible counter RCN increases by one every time the pulse appears on the output line CW and decreases by one every time the pulse appears on the output line CCW, and the one hundred number system reversible counter RCN generates signals to output lines 0, 1, 2, . . . 9, 00, 10, 20, . . . 90. The decoder circuits DECa, DECb, DECc, DECd and DECe receive the signals appearing on the output lines of the one hundred system reversible counter RCN and decode the content of said reversible counter RCN. The outputs of the decoder circuits $DECa$, $DECb$, $DECc$, $DECd$ and $DECe$ are respectively converted to the voltages having an trapezoidal form as show in FIG. 4 by the digital-analog converters $DAa$, $DAb$, $DAc$, $DAd$ and $DAe$ and supplied to the exciting current control circuits $ECCa$, $ECCb$, $ECCc$, $ECCd$ and $ECCe$ which control the exciting currents of the pulse motor.

Figure 4:
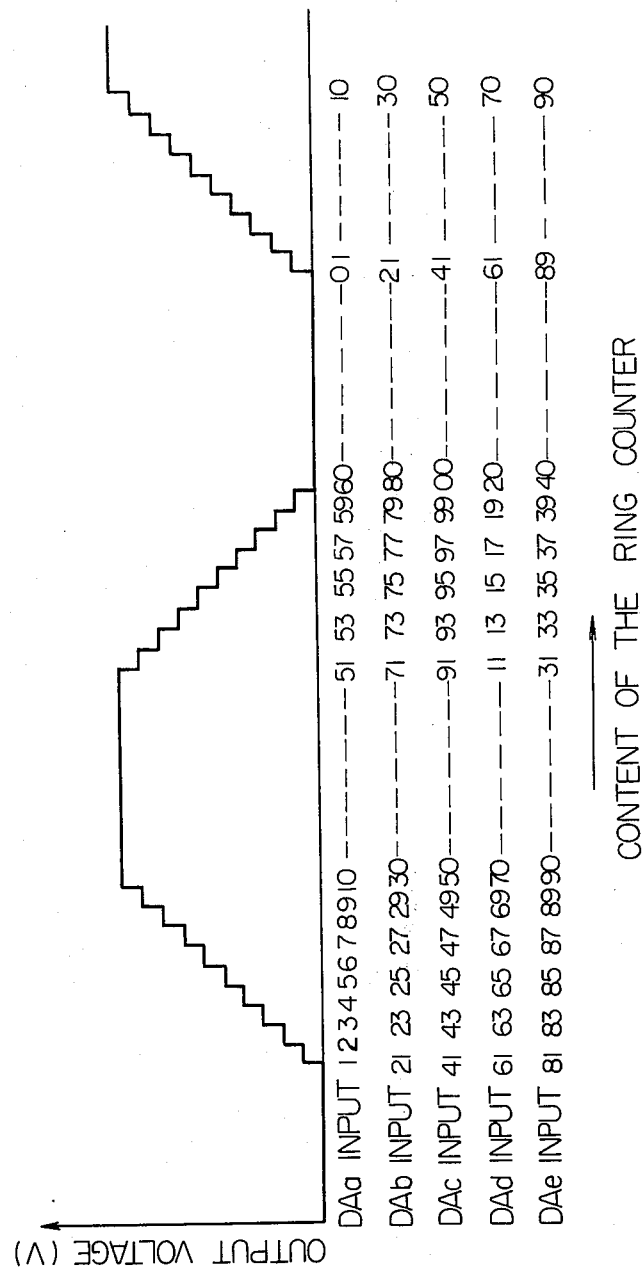
FIG. 4 is a waveform of an output voltage of the digital-analog converter included in FIG. 3.

The exciting current control circuits ECCa through ECCe respectively include amplifiers $AMPa$ through $AMPe$ and power transistors $PTa$ through $PTe$ as shown in FIG. 3. The output of the digital-analog converters $DAa$ through $DAe$ are respectively amplified by the amplifier $AMPa$ through $AMPe$ and supplied to base terminals of the power transistors $PTa$ through $PTe$. Since the exciting current control circuits are designed so that input-output characteristics of them are linear, the exciting currents which flow in the exciting coils $La$ through $Le$ also become trapezoidal in form as shown in FIG. 4. Resistors $Ra$ through $Re$ in the exciting current control circuits ECCa through ECCe, respectively, are provided for detecting the exciting currents in the exciting coils $La$ through $Le$ and for feeding back to inputs of the amplifiers $AMPa$ through $AMPe$.

Figure 5:
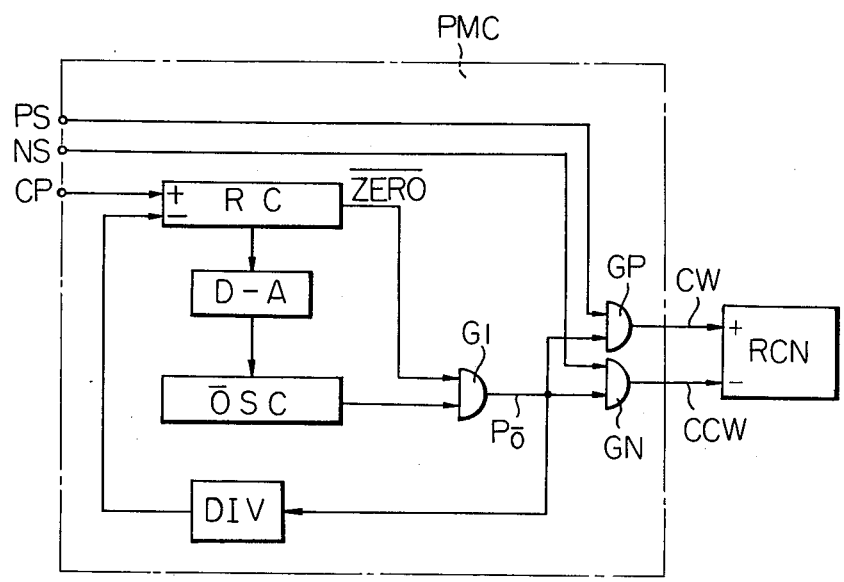
FIG. 5 is a detailed circuit of the pulse multiplier circuit included in FIG. 3.

FIG. 5 is a detailed circuit of the pulse multiplier circuit PMC. The command pulses CP are stored in a reversible counter RC. The content of the reversible counter RC is converted by a digital-analog converter DA to a voltage signal and said voltage signal is applied to a variable frequency oscillator OSC. The variable frequency oscillator generates a sequence of an output pulses having a frequency which is proportional to the output signal of the digital-analog converter DA. Another output of the reversible counter RC is supplied to a first input terminal of an AND gate $G_1$. Said output is a signal $\overline{ZERO}$, which becomes logic 1 when the content of the reversible counter RC is not zero, and becomes logic 0 when content of the reversible counter RC is zero. A sequence of the output pulses of the oscillator OSC is supplied to a second input terminal of the AND gate $G_1$. The output of the AND gate $G_1$ is divided by a frequency divider DIV and supplied to a subtract input of the reversible counter RC. When the dividing ratio of the frequency divider DIV is determined to be $1/n$, so that the frequency divider DIV generates one pulse whenever n pulses are supplied to its input terminal, a sequence of pulses $\overline{PO}$ having n times the number of command pulses CP are obtained at the output terminal of the AND gate $G_1$. The output $\overline{PO}$ of the AND gate $G_1$ is supplied to one input terminal of each of the gates GP and GN. The other input terminals of the gates GP and GN receive the signals PS and NS respectively, and the gates GP and GN are respectively controlled by these signals which indicate the polarities of the command pulses CP. Therefore, the positive pulses are supplied via a signal line CW from the gate GP to the reversible counter RCN, and the negative pulses are supplied via a signal line CCW from the gate GN to the reversible counter RCN.

Figure 6:
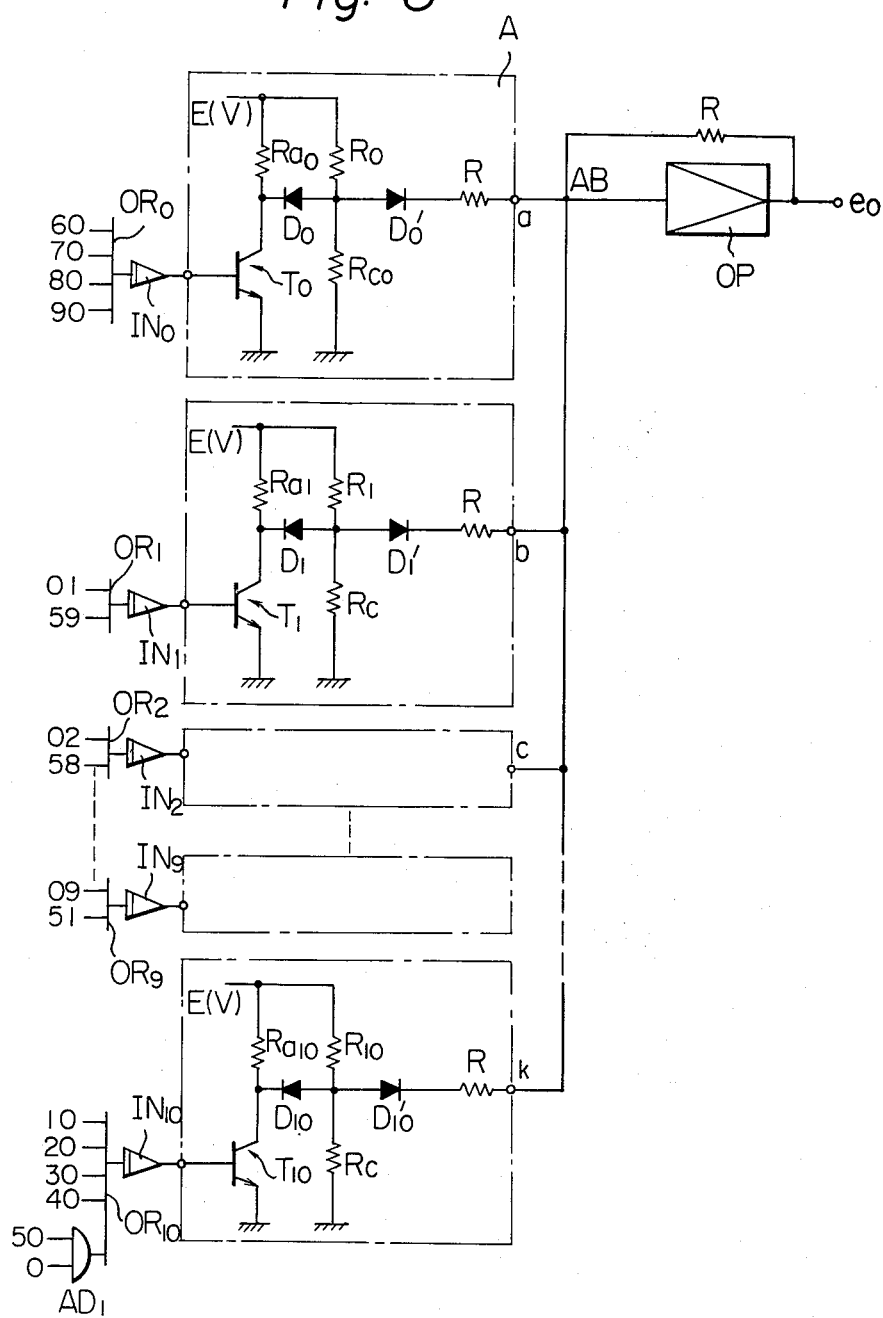
FIG. 6 is a detailed circuit of the digital-analog converter DAa included in FIG. 3.

FIG. 6 is a datailed circuit diagram of the digital-analog converter DAa shown in FIG. 3. With respect to the digital-analog converters $DAb$ through $DAe$, explanations similar to the following for $DAa$ are applicable. Referring to FIG. 6, numbers 01 through 09, 51 through 59, 10 through 90 are the outputs of the decode circuit $DECa$ and these outputs are obtained by decoding the content of the one hundred number system reversible counter RCN. For example, the number 09 becomes logic 1 (positive voltage) when the content of the reversible counter is the number 09, the numbers 10, 20, . . . 90 respectively become logic 1 when the content of the reversible counter are the numbers 10 through 19, 20 through 29 . . . 90 through 99. For obtaining the output voltage as shown in FIG. 4, it is necessary that the output of the digital-analog converter is composed of four portions. That is, a first portion, which increases gradually from zero value to a maximum level while the content of the reversible counter is 01 through 10; a second portion, which is held at the maximum level while the content of the reversible counter is 10 through 50; a third portion, which decreases gradually from the maximum level to zero level while the content of the counter is 50 through 60; and, a fourth portion, which is held at zero level while the content of the counter is 60 through 00. Referring to FIG. 6, the inputs 60, 70, 80 and 90 are connected via an OR circuit $OR_o$ and an inverter $IN_o$ to a transistor $T_o$ whose emitter is grounded. The collector of the transistor $T_o$ is connected via a resistor $Rao$ to an electric source potential $E(V)$. The connection point of the collector of the transistor $T_o$ and the resistor $R_a$ is connected via a series circuit composed of diodes $D_o$ and $D_o'$ and a resistor R to the output terminal a. A resistor $R_o$ is connected between the electric source potential E(V) and the connection point of the diodes $D_o$ and $D_o'$, and said connection point is connected via a register $R_{co}$ to ground. The inputs 01 and 59 are connected via an OR circuit $OR_1$ and an inverter $IN_1$ to a transistor $T_1$ whose emitter is grounded. The collector of the transistor $T_1$ is connected via a resistor $R_a$ to an electric source potential E(V). The connection point of the collector of the transistor $T_1$ and the resistor $R_a$ is connected via a series circuit composed of diodes $D_1$ and $D_1'$, and a resistor R to the output terminal b. A resistor $R_1$ is connected between the electric source potential E(V), and the connection point of the diodes $D_1$ and $D_1'$, and said connection point is further connected via a resistor $R_c$ to ground.

With respect to the inputs 02, 58; . . . ; 09, 51, identical connections with these of the inputs 01 and 59 are applicable.

With respect to the inputs 0, 10, 20, 30, 40 and 50, identical connections with these of the inputs 60, 70, 80 and 90 are applicable except that inputs 50 and 0 are impressed to an AND gate $AD_1$ of which output terminal connected to the OR circuit $OR_{10}$.

The output points a, b, . . . k are connected at one point AB and connected, via an operational amplifier OP and a parallel resistor R, to the exciting current control circuit ECCa.

If it is assumed that the content of the reversible counter RCN is a number 77, only the output having a number 70 of the decoder circuit DECa becomes a logic 1. Said output of the decoder circuit DECa supplied via the inverter $IN_o$ to the transistor $T_o$ and the transistor $T_o$ is placed in a cut off condition and a voltage $E(R_{co}/R_{co} + R_o)$ appears at the input of the operational amplifier. In the embodiment, the value of the resistance $R_{co}$ equals zero, because it is necessary that the output level of the digital-analog converter DAa is zero when the content of the reversible counter RCN is between 60 and 99.

When the content of the reversible counter RCN is 01, 02, . . . 10, only one of the transistors $T_1$, $T_2$, . . . $T_{10}$ is placed in a cut off condition, and the voltages $E(R_c/R_c + R_1)$, . . . , $E(R_c/R_c + R_{10})$ appear at the point AB. When the relation among $R_1$, $R_2$, . . . , $R_{10}$ is $R_1 < R_2 < R_3 < . . . < R_{10}$, the output of the digital-analog converter DAa increases in accordance with the increase of the content of the reversible counter RCN from 01 to 10.

When the content of the reversible counter is 10 through 50, only the transistor $T_{10}$ is placed in a cut off condition and the maximum voltage $E(R_c/R_c + R_{10})$ appears at the output terminal AB.

When the contents of the reversible counter is 51 through 60, it is easily understood that the output voltage of the digital-analog converter DAa decreases in accordance with the increase of the content of the reversible counter RCN from 51 to 60.

As mentioned above, the output voltage having the waveform shown in FIG. 4 is obtained at the output terminal of the digital-analog converter.

FIGS. 7A to 7G show waveforms of the exciting currents according to the present invention. FIG. 7A shows the command pulses CP which are supplied from the numerical control apparatus NC to the pulse multiplier circuit PMC, and FIG. 7B shows the output pulses CW which are generated in the pulse multiplier circuit PMC. FIG. 7C through FIG. 7G are respectively the output waveforms Aa through Ea of the digital-analog converters DAa through DAe. The outputs Aa through Ea of the digital-analog converters are linearly amplified by the exciting control circuits ECCa through ECCe and supplied to the exciting coils of the electric pulse motor. Consequently, the current waveforms which flow in each exciting coil La through Le are trapezoidal, and one of the currents which flows in each exciting coil increases linearly when the exciting condition is changed from two phase excitation to three phase excitation, and decreases linearly when the exciting condition is changed from three phase excitation to two phase excitation.

Figure 8:
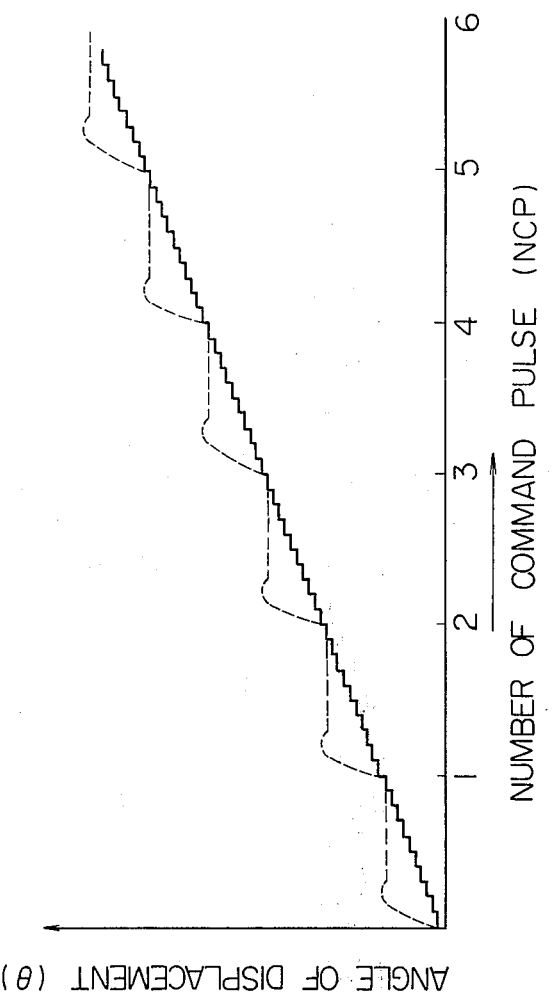
FIG. 8 is a diagram, showing a relation between the angle of the revolution and the number of the command pulses.

FIG. 8 shows a relation between the number of the command pulses (NCP) and the angle of the displacement (O), comparing the conventional system and the system of the present invention. The dotted line refers to the conventional system and the solid line refers to the system according to the present invention. As is clear from FIG. 8, in the system of the present invention, the angle of displacement increases very smoothly.

As mentioned above, whenever one command pulse is applied to the system for driving an electric pulse motor of the present invention one of the exciting currents of each exciting coil varies linearly and, torque on the rotor of the electric pulse motor which is produced by said exciting currents increases or decreases very smoothly. Therefore, the movement of the moving part of the pulse motor becomes very smooth, and the unevenness of the finished surface of the work can be completely removed.

What is claimed is:

1. A method for driving an electric pulse motor which provides n exciting coils and moves in response to command pulses, which comprises the steps of
    generating selectively, in accordance with said command pulses, n exciting control voltages which have approximate trapezoidal waveforms inclined at the rise and fall portions, said exciting control voltages being generated, in order, with a phase difference which depends on the speed of said command pulses,
    amplifying said exciting control voltages respectively by linear current amplifiers each of which is connected respectively to said n exciting coils,
    applying the amplified outputs of said linear current amplifiers respectively to said exciting coils of said motor, and
    thereby smoothing the movement of said electric pulse motor.

2. A system for driving an electric pulse motor which provides n exciting coils and moves in response to command pulses, comprising,
    means for generating selectively, in accordance with said command pulses, n exciting control voltages which have approximate tapezoidal waveforms inclined at the rise and fall portions, said exciting control voltages being generated, in order, with a phase difference which depends on the speed of said command pulses,
    amplifying means including n linear current amplifiers which amplify said exciting control voltages respectively and each of which is connected respectively to said n exciting coils, means for applying the amplified outputs of said linear current amplifiers respectively to said exciting coils of said motor.

3. The system for driving an electric pulse motor according to claim 2, wherein said generating means comprises a pulse multiplier circuit for producing a series of pulses by multiplying said command pulses, reversible counting means for counting reversibly said series of pulses in accordance with the sign of said command pulses, and digital to analogue converting means for generating said n exciting control voltages in accordance with the contents of said reversible counting means.

4. The method of claim 1 in which said generating step includes multiplying said command pulses n times for producing a series of pulses, counting reversibly said series of pulses in accordance with the sign of said command pulses, and generating said n exciting control voltages in accordance with the reversible counting.

* * * * *